US008930115B2

(12) United States Patent
Filev et al.

(10) Patent No.: US 8,930,115 B2
(45) Date of Patent: Jan. 6, 2015

(54) EFFICIENCY-BASED SPEED CONTROL WITH TRAFFIC-COMPATIBLE SPEED OFFSETS

(71) Applicant: Ford Global Technologies, LLC, Dearborn, MI (US)

(72) Inventors: Dimitar P. Filev, Novi, MI (US); John O. Michelini, Sterling Heights, MI (US); Steven J. Szwabowski, Northville, MI (US); Diana Yanakiev, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 13/777,080

(22) Filed: Feb. 26, 2013

(65) Prior Publication Data
US 2014/0244129 A1 Aug. 28, 2014

(51) Int. Cl.
*B60K 31/00* (2006.01)
*B60W 50/00* (2006.01)
*B60W 30/14* (2006.01)

(52) U.S. Cl.
CPC ............ *B60K 31/00* (2013.01); *B60W 50/0097* (2013.01); *B60W 30/143* (2013.01); *B60K 2310/244* (2013.01); *B60W 2050/0083* (2013.01); *B60W 2550/142* (2013.01); *B60W 2550/20* (2013.01)
USPC .................................. 701/93; 701/94; 701/96

(58) Field of Classification Search
USPC ......... 701/93–96, 110, 36; 180/170, 177–179
See application file for complete search history.

(56) References Cited

U.S. PATENT DOCUMENTS

| 5,933,100 | A | 8/1999 | Golding |
| 6,317,678 | B1 * | 11/2001 | Linden ........................... 701/94 |
| 6,321,162 | B1 | 11/2001 | Hessing |
| 6,374,173 | B1 | 4/2002 | Ehlbeck |

(Continued)

FOREIGN PATENT DOCUMENTS

GB 2480877 A 7/2011

OTHER PUBLICATIONS

Lin, et al., "A stochastic control strategy for hybrid electric vehicles," American Control Conference, 2004. Proceedings of the 2004, vol. 5, no., pp. 4710-4715 vol. 5, Jun. 30 2004-Jul. 2 2004.

(Continued)

*Primary Examiner* — Richard Camby
(74) *Attorney, Agent, or Firm* — Gregory P. Brown; MacMillan, Sobanski & Todd, LLC

(57) ABSTRACT

Vehicle apparatus includes a speed control for adjusting a vehicle powertrain of the vehicle in response to a speed setpoint. A grade estimator determines a road grade of a roadway where the vehicle is traveling. A traffic density estimator determines a density of traffic traveling on the roadway in the vicinity of the vehicle. An optimizer executes a selected control policy to periodically generate speed adjustments for applying to the speed setpoint to operate the vehicle powertrain at increased efficiency. The control policy is based on a value function providing an optimized solution for a cost model responsive to the determined road grade to generate an initial speed offset. The optimizer reduces the initial speed offset in proportion to the determined traffic density to generate the speed adjustments. The system minimizes negative impacts to overall traffic flow as well as any negative contribution to reduced fuel efficiency of surrounding traffic.

15 Claims, 3 Drawing Sheets

(56) References Cited

U.S. PATENT DOCUMENTS

| | | |
|---|---|---|
| 6,480,783 B1 | 11/2002 | Myr |
| 6,990,401 B2 | 1/2006 | Neiss et al. |
| 7,289,039 B2 | 10/2007 | Kato et al. |
| 7,383,154 B2 | 6/2008 | Tate, Jr. |
| 7,440,843 B2 | 10/2008 | Yoshikawa et al. |
| 7,774,123 B2 | 8/2010 | Schröder |
| 7,859,392 B2 | 12/2010 | McClellan et al. |
| 7,899,610 B2 | 3/2011 | McClellan |
| 8,060,606 B2 | 11/2011 | Friedman et al. |
| 8,265,850 B2 | 9/2012 | Shin |
| 2007/0265759 A1 | 11/2007 | Salinas et al. |
| 2008/0114521 A1 | 5/2008 | Doering |
| 2009/0271084 A1 | 10/2009 | Taguchi |
| 2009/0276135 A1 | 11/2009 | Hagemann et al. |
| 2010/0204896 A1 | 8/2010 | Biondo et al. |
| 2012/0176234 A1 | 7/2012 | Taneyhill et al. |
| 2012/0197504 A1 | 8/2012 | Sujan et al. |
| 2012/0239282 A1 | 9/2012 | Taguchi |

OTHER PUBLICATIONS

Kolmanovsky, et al., "Stochastic optimal control of systems with soft constraints and opportunities for automotive applicants," Control Applications, (CCA) & Intelligent Control, (ISIC), 2009 IEEE, vol., no., pp. 1265-1270, Jul. 8-10, 2009.

Kolmanovsky, et al., Terrain and Traffic Optimized Vehicle Speed Control, 2010, pp. 378-383.

Filev, et al., "A generalized Markov Chain modeling approach for on board applications," Neural Networks (IJCNN), The 2010 International Joint Conference on, vol., no., pp. 1-8, Jul. 18-23, 2010.

McDonough, et al., "Modeling of vehicle driving conditions using transition probability models," Control Applications (CCA), 2011 IEEE International Conference on, vol., no., pp. 544-549, Sep. 28-30, 2011.

Desjardins, et al., Cooperative Adaptive Cruise Control: A Reinforcement Learning Approach, IEEE Transactions on Intelligent Transporation Systems, vol. 12, No. 4, Dec. 2011, pp. 1248-1260.

McDonogh, et al., "Stochastic dynamic programming control policies for fuel efficient in-traffic driving," American Control Conference (ACC), 2012, vol., no., pp. 3986-3991, Jun. 27-29, 2012.

\* cited by examiner

EFFICIENCY-BASED SPEED CONTROL WITH TRAFFIC-COMPATIBLE SPEED OFFSETS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle speed control systems, and, more specifically, to optimizing energy efficiency of a speed-controlled vehicle without advance knowledge of actual road grade variations along a route of travel or any pre-planning of a route.

Vehicle manufacturers continually strive to minimize energy consumption for driving a vehicle (e.g., maximizing the distance driven per unit of gas for a gasoline vehicle or unit of electrical charge for an electrically-driven vehicle). Important influences on efficiency include the speed at which the vehicle is driven, road grade variations over the driven route, and traffic conditions. Automatic speed control (i.e., cruise control) systems can have a beneficial impact on fuel economy by reducing the amount of time spent accelerating the vehicle, especially during highway driving. Maintaining a single speed setting during uphill and downhill road grades, however, consumes more fuel than if the vehicle is allowed to vary in order to take advantage of road grade variations to optimize fuel consumption. If upcoming changes in road grade are known in advance (such as from GPS-based maps and advance routing), then temporary offsets can be introduced in the speed setting that accordingly improve energy consumption. However, GPS navigation devices and the necessary in-vehicle map data, computational, and/or remote data communications requirements to determine such offsets in real-time on-board a vehicle represent a significant cost or may be unavailable in some areas. Therefore, it would be desirable to lessen such requirements for determining appropriate speed offsets.

The paper Kolmanovsky et al., *Terrain and Traffic Optimized Vehicle Speed Control*, 6TH IFAC SYMPOSIUM ADVANCES IN AUTOMOTIVE CONTROL, MUNICH, JULY 2010, which is incorporated herein by reference, describes the derivation of a control policy for use by a vehicle in a specific geographic region for best on-average performance without advance knowledge of a route to be traveled or the actual upcoming road grade being approached. The control policy prescribes a vehicle speed setpoint to achieve optimal tradeoff between expected average fuel economy and expected average travel speed. Terrain and traffic properties (i.e., driving conditions) are aggregated as transition probability matrices (TPM) of a Markov Chain model. Stochastic dynamic programming generates the control policy off-line (i.e., off-board the vehicle during the design phase of the vehicle using independent characterization of the terrain), which is then loaded into the vehicle for use when it is driven in the corresponding region.

The paper McDonough et al., *Modeling of Vehicle Driving Conditions Using Transition Probability Models*, 2011 IEEE MULTI-CONFERENCE ON CONTROL APPLICATIONS, DENVER, SEPTEMBER 2011, which is incorporated herein by reference, discloses the use of Kullback-Leibeler (KL) divergence between transition probability matrices of Markov model to differentiate between similar or dissimilar driving conditions. Based on a TPM corresponding to a vehicle's current driving conditions, KL divergence could be used to interpolate control policies developed for a discrete set of typical driving cycles for adaptation of vehicle powertrain operation to the terrain and traffic conditions.

Co-pending U.S. application Ser. No. 13/777,049, filed Feb. 26, 2013, entitled "On-Board Real-Time Speed Control Setpoint Variation Using Stochastic Optimization," which is incorporated herein by reference, discloses a robust system for selecting control policies to be executed by a vehicle to vary its set speed in a manner that optimizes energy consumption. As a result of the variable speed offsets being continuously applied, a relative distance between the host vehicle and any other vehicles in its vicinity that are not executing the same optimization strategy (e.g., are driving at a constant speed) would also constantly change.

If the control policy is configured to aggressively obtain a high level of efficiency improvement, then the speed fluctuations of the vehicle may be large enough to negatively impact the surrounding traffic flow. Above a certain traffic density, the reactions of other vehicles to the fluctuations of the host vehicle may increase the likelihood of overall slowdowns that negatively impact the fuel economy of all the vehicles (including the host vehicle).

The present invention is also applicable to other systems or control policies that attempt to optimize energy consumption or other vehicle parameters by varying the vehicle speed based on other than road grade considerations. Such other systems may include pulse and glide, dynamic programming, or heuristic approaches.

SUMMARY OF THE INVENTION

The present invention provides a speed control system that minimizes its impact on surrounding traffic while trying to achieve the best fuel economy possible. The speed control system is configurable to adopt either a constant speed setpoint (e.g., either a constant cruise control or an adaptive cruise control) or a variable speed setpoint based on a control policy (referred to herein as an efficient cruise system). In heavy traffic conditions, the efficient cruise system should defer to a constant speed control system (in which the amplitude of speed variations is zero or very small) or an adaptive cruise control to maintain a preselected following distance to the cars in front, thereby minimizing the effect on speed of surrounding traffic. For conditions from light traffic up to heavy traffic, the system adopts a relative proportion of the speed offsets recommended by the control policy which go from a maximum in light traffic down to zero (i.e., constant cruise) in heavy traffic. When no surrounding traffic is detected (e.g., no lead vehicle is present), the system uses the offsets from the control policy unmodified. In this way, the system minimizes its negative impacts to overall traffic flow continuity as well as any negative contribution to reduced fuel efficiency of the surrounding traffic, both of which could occur if oscillations in surrounding vehicle speed are induced above those experienced in normal traffic flow conditions.

In one aspect of the invention, a vehicle apparatus comprises a speed control for adjusting a vehicle powertrain of the vehicle in response to a speed setpoint. A grade estimator determines a road grade of a roadway where the vehicle is traveling. A traffic density estimator determines a density of traffic traveling on the roadway in the vicinity of the vehicle. An optimizer executes a selected control policy to periodically generate speed adjustments for applying to the speed setpoint to operate the vehicle powertrain at increased efficiency. The control policy is based on a value function providing an optimized solution for a cost model responsive to the determined road grade to generate an initial speed offset. The optimizer reduces the initial speed offset in proportion to the determined traffic density to generate the speed adjustments.

DETAILED DESCRIPTION OF PREFERRED EMBODIMENTS

Figure 1:
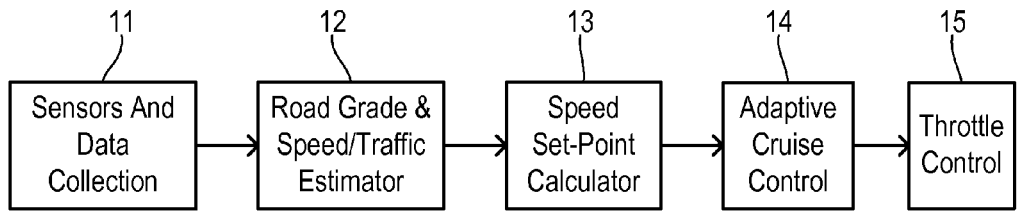
FIG. 1 is a block diagram of a vehicle apparatus of the invention.

Referring now to FIG. 1, a vehicle apparatus 10 includes various components for implementing a speed advisory and/or control system for achieving improved fuel economy. A sensors and data collection block 11 uses commonly available devices and interconnections to supply and communicate various items of information as described below. A block 12 is a road grade and speed/traffic estimator that characterizes the current driving conditions of the vehicle for use by a speed set-point calculator (i.e., optimizer) 13. Road grade may be determined by GPS measurements together with a map database, by using other sensors such as an inclinometer or pitch sensor or calculated from accelerometer measurements, or by estimating it from other commonly available vehicle data such as from load and vehicle speed information provided by the powertrain control strategy. Speed or density of surrounding traffic can be measured using a radar or camera that may be provided as part of an adaptive cruise control system or vehicle guidance system, or may be obtained from an off-board information source via a wireless data network, for example. Calculator 13 implements a control policy that determines periodic changes to a speed set-point which are communicated to an adaptive cruise control block 14. Block 14 compares actual vehicle speed with the speed set-point and sends corresponding commands to a throttle control 15.

Figure 2:
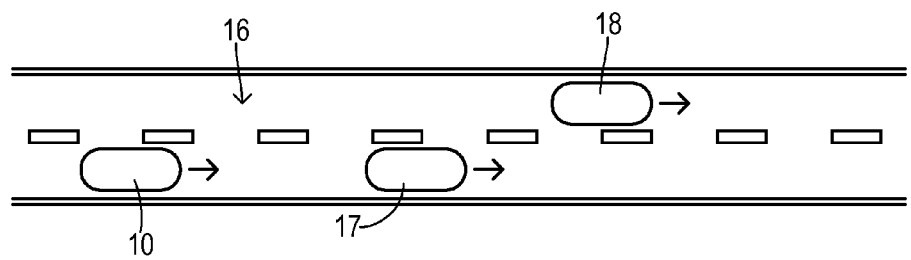
FIG. 2 is a diagram showing a roadway carrying traffic around a host vehicle.

FIG. 2 depicts a driving situation in which host vehicle 10 is traveling on a roadway 16 behind a lead vehicle 17 and in the presence of other traffic 18. In a conventional non-adaptive cruise control, vehicle 10 may follow an operator determined speed set-point until it is deactivated by the operator. In an adaptive cruise control, vehicle 10 may detect the presence of vehicle 17 and then reduce the speed set-point to prevent a close approach to lead vehicle 17. With either type of conventional cruise control, a particular speed set-point may be followed without regard to optimizing fuel economy which is affected by variations in road grade and/or traffic conditions as the vehicle travels.

Figure 3:
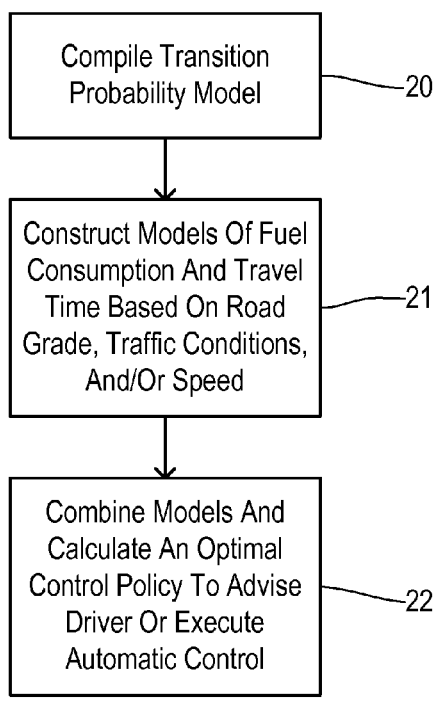
FIG. 3 is a block diagram showing a basic modeling process underlying the invention.

FIG. 3 shows an approach to vehicle control wherein an optimized speed profile can be generated which improves fuel efficiency. The approach is known as a stochastic optimal control that applies stochastic dynamic programming (SDP) to models of fuel consumption, travel time and distance, and the various grade and traffic conditions that affect efficiency, time, and distance. Thus, in a step 20 a transition probability model is made as a characterization of the predictable patterns in traffic speed and road grade for a particular region. Models of fuel consumption (e.g., for a particular make/model of vehicle) and travel time to reach a destination are constructed in step 21 based on road grade, traffic conditions, and/or speed. Using stochastic dynamic programming (SDP), the models are combined and an optimal control policy is calculated which can control the speed set-point in order to obtain a best average performance of fuel efficiency and travel time. Based on the control policy, a vehicle control system can either advise the driver of recommended speed changes or execute automatic control of the speed set-point of the cruise control system.

A benefit of this approach is that it does not assume advanced knowledge of the route to be travelled, only that the vehicle is being driven in a specific geographic region. The objective is to determine a control policy which, on one hand, is responsive only to current operating conditions (as is the case for the conventional powertrain control strategy), but on the other hand, provides best on-average performance when travelling frequently in this region. In other words, a vehicle speed set-point is desired which achieves an optimal trade-off between expected average fuel economy and expected average travel speed. In this approach as described in the Kolmanovsky and McDonough papers cited above, the region's terrain and traffic properties are characterized in the transition probabilities of a Markov chain.

Figure 4:
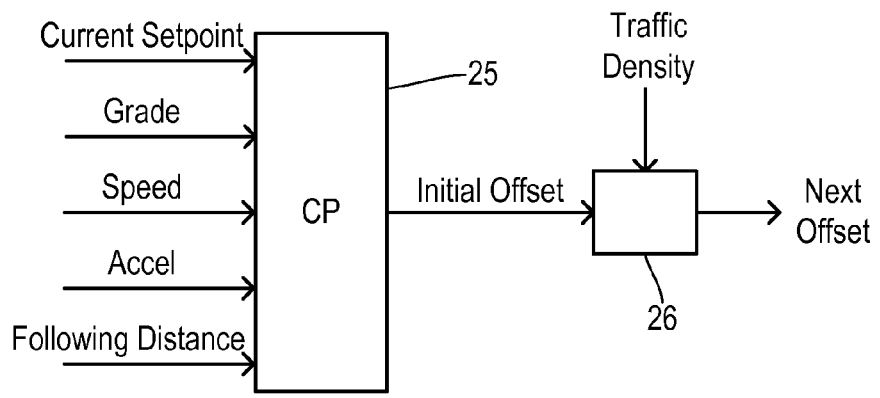
FIG. 4 is a block diagram showing modification of a speed offset generated by a control policy.

As shown in FIG. 4, an optimizer of the present invention includes a control policy calculation block 25 receiving various input variables such as current speed setpoint, current road grade, traffic speed, host-vehicle acceleration, and traffic following distance to generate an initial speed offset which is coupled to a modifier 26. The initial offset can be derived as disclosed in co-pending application serial number (83341069) which attempts to optimize fuel economy without regard to any affects on surrounding traffic. Modifier 26 reduces the initial speed offset in proportion to a determined traffic density to generate a next speed offset in proportion to the traffic density. Traffic density may be determined according to a continuous scale or may be classified according to discrete categories (which may depend on the particular manner for deriving the traffic density). Traffic density can be estimated using onboard sensors such as radar, lidar, and optical cameras which may already be available on a vehicle as part of other systems such as back-up assistance, adaptive cruise control, cross-traffic alert systems, lane keeping assistance, collision warning, and blind spot monitoring. In addition, off-board sources which monitor traffic conditions can be consulted via various communication channels such as vehicle-to-vehicle communication systems, an internet connection, and satellite/navigation systems.

Figure 5:
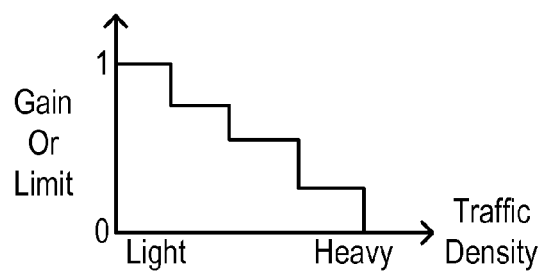
FIG. 5 is a graph showing a stepwise reduction based on traffic density.

FIG. 5 graphically depicts a step-wise reduction for altering each initial speed offset according to discrete levels of traffic density. When a gain factor is employed, a maximum gain equal to one is adopted in no or light traffic. For each successively greater range of traffic density, the relative gain applied to the speed offset decreases in steps until a gain of zero is employed for high traffic density. If applying an absolute limit (e.g., clipping of the initial offset values), the applied limit goes from a maximum value at light traffic and step-wise decreases to a minimum or zero value for heavy traffic.

Figure 6:
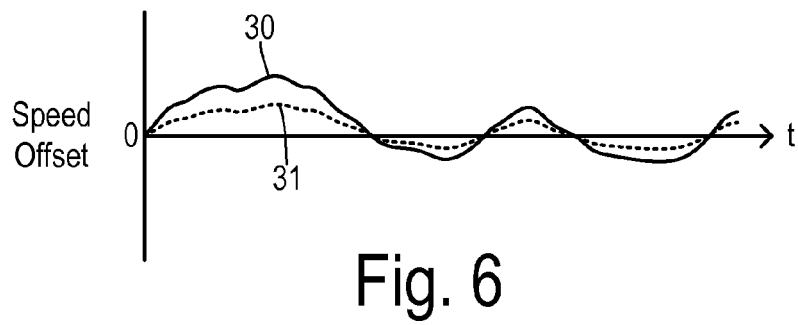
FIG. 6 is a graph showing modified speed offsets determined using a gain factor.

FIG. 6 illustrates a speed offset that is modified using a gain factor. A curve 30 plots a varying value of the initial speed offset generated by the control policy (i.e., changes to be made in the speed setpoint that would optimize the energy consumption). Under intermediate traffic density conditions between light and heavy traffic, an intermediate gain factor is selected and then used to modify the initial speed offsets. Thus, smaller speed offsets are executed by the speed control, as represented by dashed line 31.

Figure 7:
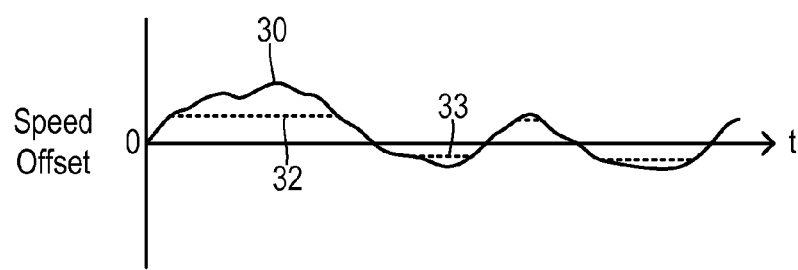
FIG. 7 is a graph showing modified speed offsets determined using a clamping limit.

FIG. 7 represents the alternative embodiment wherein a selected cutoff limit is applied to the initial offset represented by curve 30. Thus, the applied speed offset is clipped to a maximum value at 32 or a minimum value at 33 in order to reduce any disruption of other vehicles in the vicinity attempting to proceed at a constant speed.

Figure 8:
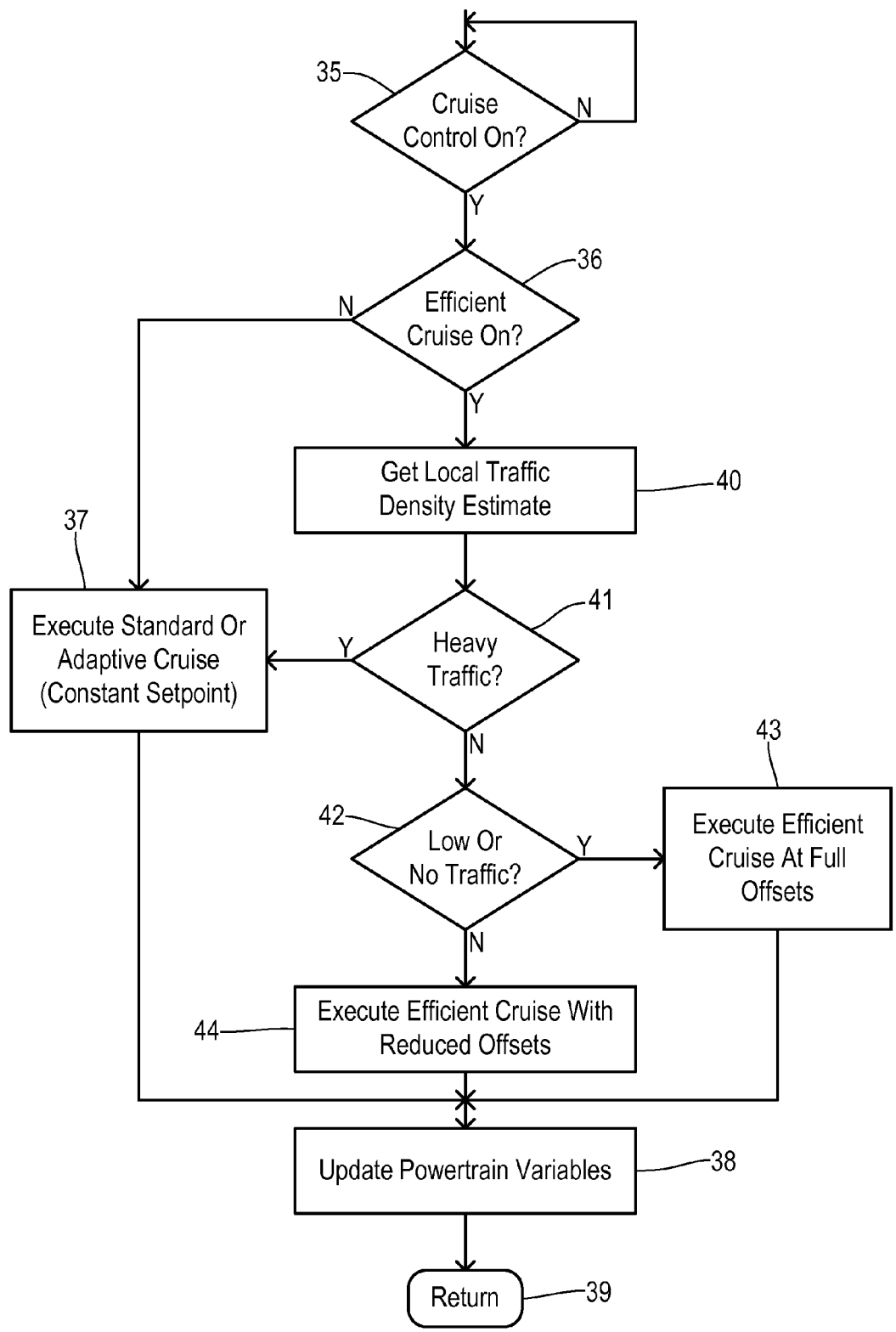
FIG. 8 is a flowchart showing one preferred method of the invention.

FIG. 8 shows a preferred method of the invention that begins with a check in step 35 to determine whether the driver has activated a cruise control function. If not, then the system waits until cruise control is turned on at step 35. Once cruise control is activated, a check is performed in step 36 to determine whether the efficient cruise function has been enabled. If not, then it is assumed that the driver intends for constant speed operation instead of trying to optimize fuel economy. Therefore, either a standard fixed or adaptive cruise control function is executed in step 37 according to a constant speed setpoint. Based on the constant setpoint, powertrain variables are updated in step 38 in a conventional manner for maintaining the constant setpoint (as may be modified by an adaptive cruise control in the presence of blocking vehicles). Thereafter, a return is performed in step 39.

In the event the efficient cruise function is on in step 36, then a local traffic density estimate is obtained in step 40. A check is performed in step 41 to determine whether the traffic density estimate identifies the presence of heavy traffic. If so, then the standard fixed or adaptive cruise function is executed in step 37. If traffic is not heavy then a check is performed in step 42 to determine whether a condition of no traffic or low traffic density is present. If so, then interference with other traffic flow is not a concern and the efficient cruise control is executed using full offsets in step 43. Based on those offsets, powertrain variables are updated in step 38.

If the traffic density estimate does not indicate low or no traffic in step 42, then an intermediate traffic density is present. In response, the efficient cruise control is executed in step 44 with reduced offsets. Preferably, the traffic density estimate represents a plurality of values or ranges between low and heavy traffic, and the reduction of the initial speed offset from the control policy is proportionally reduced in a step-wise fashion according to the magnitude of the traffic density estimate.

What is claimed is:

1. Vehicle apparatus comprising:
a speed control for adjusting a vehicle powertrain of the vehicle in response to a speed setpoint;
a traffic density estimator for determining a density of traffic traveling on the roadway in the vicinity of the vehicle; and
an optimizer for executing a selected control policy to periodically generate speed adjustments for applying to the speed setpoint to operate the vehicle powertrain at increased efficiency, wherein the control policy is based on a value function providing an optimized solution for a cost model to generate an initial speed offset, wherein the optimizer reduces the initial speed offset in proportion to the determined traffic density to generate the speed adjustments, wherein the optimizer compares the traffic density to a heavy traffic threshold, and wherein the speed setpoint is unmodified by the optimizer if the traffic density is greater than the heavy traffic threshold.

2. The apparatus of claim 1 further comprising:
a grade estimator for determining a road grade of a roadway where the vehicle is traveling;
wherein the value function of the cost model provides an optimized solution responsive to the determined road grade to generate the initial speed offset.

3. The apparatus of claim 1 wherein the optimizer compares the traffic density to a light traffic threshold, and wherein the initial speed offset is unreduced by the optimizer if the traffic density is less than the light traffic threshold.

4. The apparatus of claim 1 wherein the optimizer compares the traffic density to a light traffic threshold and to a heavy traffic threshold, and wherein the initial speed offset is proportionally reduced in a stepwise fashion when the traffic density is between the light traffic threshold and the heavy traffic threshold.

5. The apparatus of claim 1 wherein the optimizer selects a gain factor in response to the traffic density for proportionally reducing the initial speed offset.

6. The apparatus of claim 1 wherein the optimizer selects an offset limit in response to the traffic density, and wherein the initial speed offset is proportionally reduced by clamping at the selected offset limit.

7. A method of controlling a speed setpoint of a speed control for a vehicle, comprising the steps of:
retrieving a control policy which represents an optimized value function for reducing a cost function of operating the vehicle;
executing the control policy to identify offsets to the speed setpoint in the speed control;
estimating a traffic density in a vicinity of the vehicle;
reducing the identified offsets in proportion to the traffic density to generate adjusted offsets; and
applying the adjusted offsets to the speed setpoint.

8. The method of claim 7 further comprising the step of:
collecting road grade data during routine operation of the vehicle;
wherein the retrieved a control policy corresponds to a region where the vehicle is operating, and wherein the optimized value function reduces the cost function of operating the vehicle in response to the road grade data.

9. The method of claim 7 wherein the reducing step is comprised of comparing the traffic density to a heavy traffic threshold, and wherein the identified offsets are reduced to zero if the traffic density is greater than the heavy traffic threshold.

10. The method of claim 7 wherein the reducing step is comprised of comparing the traffic density to a light traffic threshold, and wherein the identified offsets are unreduced if the traffic density is less than the light traffic threshold.

11. The method of claim 7 wherein the reducing step is comprised of:
comparing the traffic density to a light traffic threshold;
comparing the traffic density to a heavy traffic threshold; and
the identified offsets are proportionally reduced in a step-wise fashion when the traffic density is between the light traffic threshold and the heavy traffic threshold.

12. The method of claim 11 further comprising the step of selecting a gain factor in response to the traffic density for proportionally reducing the identified offsets.

13. The method of claim 11 further comprising the step of selecting an offset limit in response to the traffic density, wherein the identified offsets are proportionally reduced by clamping at the selected offset limit.

14. Apparatus comprising:
   a vehicle speed control following a speed setpoint;
   a traffic density estimator determining a traffic density; and
   an optimizer for executing a control policy to periodically generate speed adjustments to the speed setpoint to optimize vehicle operation, wherein the optimizer reduces the speed adjustments in proportion to the determined traffic density to avoid interfering with other vehicles, and wherein speed adjustments are unreduced when traffic density is below a light traffic threshold.

15. The apparatus of claim 14 wherein speed adjustments are reduced to zero when traffic density is above a heavy traffic threshold.

* * * * *